United States Patent [19]

Kubo

[11] 4,246,532
[45] Jan. 20, 1981

[54] SYNCHRONOUS GENERATOR

[75] Inventor: Masaaki Kubo, Shizuoka, Japan

[73] Assignee: Kokusan Denki Co., Ltd., Numazu, Japan

[21] Appl. No.: 27,913

[22] Filed: Apr. 6, 1979

[30] Foreign Application Priority Data

Jun. 7, 1978 [JP] Japan .......................... 53/77653[U]
Jun. 27, 1978 [JP] Japan .......................... 53/87443[U]
Jun. 27, 1978 [JP] Japan .......................... 53/87444[U]

[51] Int. Cl.$^3$ ............................................. H02P 9/00
[52] U.S. Cl. .......................................... 322/89; 322/95
[58] Field of Search ........................ 322/89, 90, 95–98

[56] References Cited

U.S. PATENT DOCUMENTS

| | | | |
|---|---|---|---|
| 2,509,662 | 5/1950 | Wisman | 322/95 X |
| 2,758,272 | 8/1956 | Franklin | 322/96 X |
| 3,043,115 | 7/1962 | Harter | 322/96 X |
| 3,248,641 | 4/1966 | Wolanin | 322/95 |

*Primary Examiner*—Robert J. Hickey
*Attorney, Agent, or Firm*—Pearne, Gordon, Sessions, McCoy & Granger

[57] ABSTRACT

This invention relates to a synchronous generator comprising a stator having output winding means connected to a load or loads and main voltage building up means including capacitor means and capacitor exciting winding means, said capacitor means being connected across said capacitor exciting winding means, said output winding means and said capacitor exciting winding means being provided on a common core; and a rotor having field winding means across which a rectifier means is connected; wherein said synchronous generator further comprises auxiliary voltage building up means provided in said stator, said auxiliary voltage building up means causing the output winding means to provide said stator with armature reaction when initial large current has flowed through said auxiliary voltage building up means from said output winding means to thereby build up output voltage across said output winding means with the start of said generator. The auxiliary voltage building up means may be provided either in a circuit including the output winding means or in a circuit including an auxiliary winding wound on a core for the output winding means.

11 Claims, 11 Drawing Figures

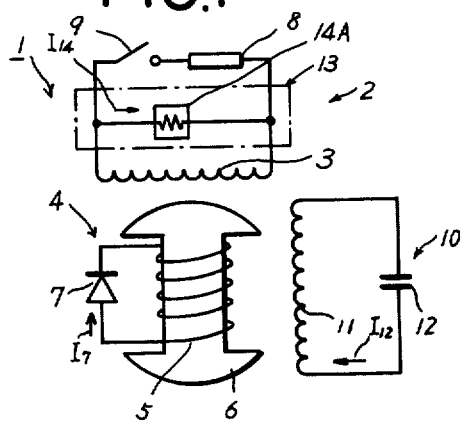
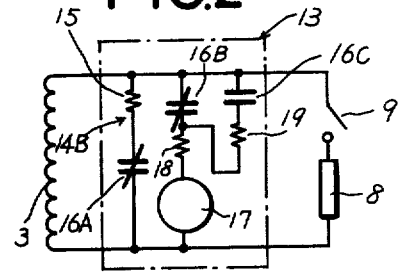
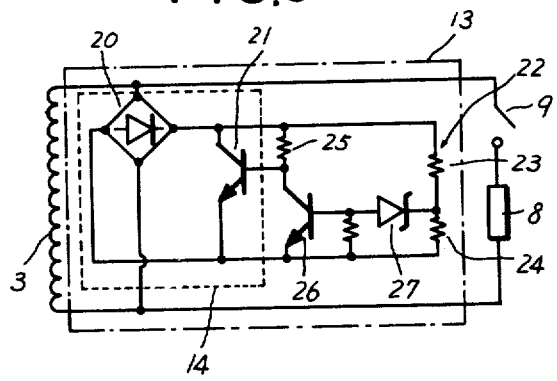
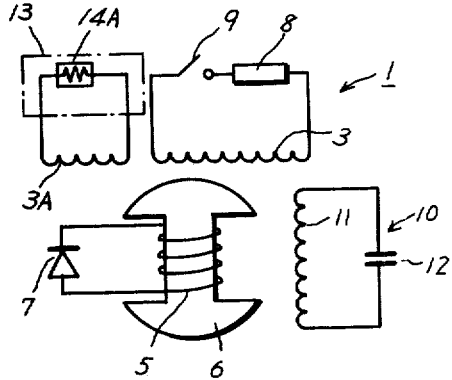
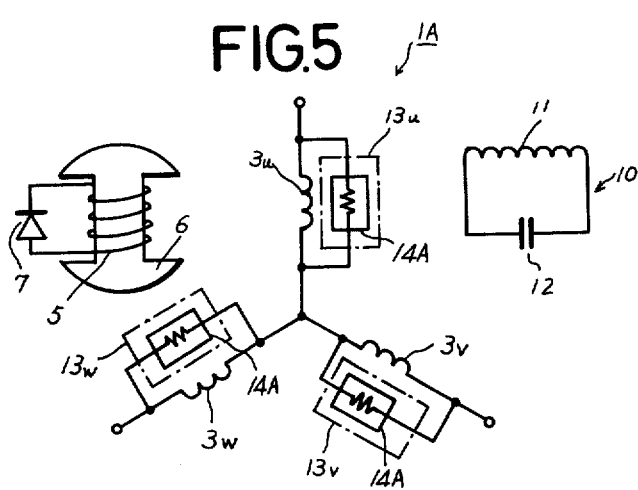
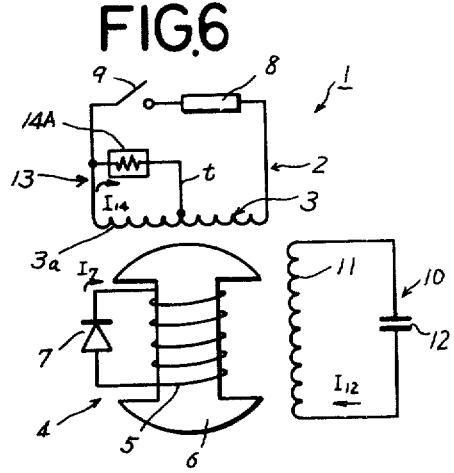

4,246,532

SYNCHRONOUS GENERATOR

BACKGROUND OF THE INVENTION

One example of a field rotating type synchronous generator has been disclosed in Japanese Patent Application Publication No. 2367/1958. This generator comprises a stator having an output winding connected to a load and main voltage building up means including a capacitor exciting winding and a capacitor connected across the ends of the capacitor exciting winding, and a rotor having a field winding across which a rectifier is connected. In such a generator, residual magnetism in a rotor core causes a voltage to be induced across the capacitor exciting winding, and accordingly, a current of advanced phase flows through the capacitor exciting winding. Increased magnetic action by the advanced phase current causes an occurrence of self-excitation while armature reaction of the capacitor exciting winding causes an electromotive force of reverse phase to be produced in the field winding. The electromotive force causes a field current to flow through the rectifier from the field winding. Thus, the field core is more excited to build up an output voltage across the output winding and the capacitor exciting winding. The load current through the load and the exciting current through the capacitor exciting winding increase the field electromotive force of reverse phase through their composite armature reaction, which causes the field current through the field winding to be enhanced. Therefore, in addition to the advantage of its brushless type generator, this generator has the advantages that decreasing a voltage drop of the output winding by the load can be restrained and that variation in the voltage can be also restrained. However, it is impossible that the prior art generator assures the rapid build-up of the voltage, because the reverse phase electromotive force is induced in the field winding only by the armature reaction through the current in the capacitor exciting winding. In order to assure the rapid build-up of the voltage across the output winding, there should be used core material having less loss of the magnetomotive force, which causes the generator to be expensive. Also, in order to increase the voltage induced across the capacitor exciting winding by residual magnetism in the core, there should be increased the number of turns of the capacitor exciting winding and the value of the capacitor, which causes the generator to be large-scaled.

SUMMARY OF THE INVENTION

Accordingly, it is a principal object of the invention to provide a synchronous generator adapted to rapidly build up an output voltage across an output winding without using expensive core material and without increasing the number of turns of the capacitor exciting winding and the value of the capacitor.

In accordance with the invention, there is provided a synchronous generator comprising a stator having output winding means connected to a load or loads and main voltage building up means including capacitor means and capacitor exciting winding means, said capacitor means being connected across said capacitor exciting winding means, said output winding means and said capacitor exciting winding means being provided on a common core; and a rotor having field winding means across which a rectifier means is connected; wherein said synchronous generator further comprises auxiliary voltage building up means provided in said stator, said auxiliary voltage building up means causing the output winding means to provide said stator with armature reaction when initial large current has flowed through said auxiliary voltage building up means from said output winding means to thereby build up output voltage across said output winding means with the start of said generator.

BRIEF DESCRIPTION OF THE DRAWINGS

The above and other objects and features of the invention will be understood from the embodiments of the invention taken with reference to the accompanying drawings in which;

FIG. 1 schematically illustrates one embodiment of a single phase synchronous generator constructed in accordance with the invention;

FIG. 2 is a schematic diagram of the auxiliary voltage building up means modified in accordance with the invention;

FIG. 3 is a schematic diagram of another modified auxiliary voltage building up means;

FIG. 4 schematically illustrates another embodiment of a single phase synchronous generator of the invention;

FIG. 5 schematically illustrates another embodiment similar to that of FIG. 1, but of a three phase synchronous generator;

FIG. 6 schematically illustrates further embodiment of a single phase synchronous generator of the invention;

DETAILED DESCRIPTION OF THE EMBODIMENTS

Figure 7:
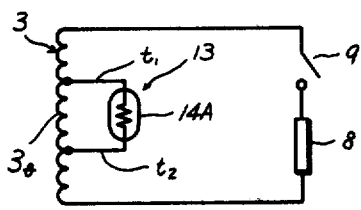
FIG. 7 is a schematic diagram of the modified auxiliary voltage building up means of FIG. 6.

Referring now to FIG. 1, there is shown a single phase synchronous generator 1 comprising a stator 2 having an output winding 3 provided therein and a rotor 4 having a field winding 5 wound on a rotor core 6. A half-wave rectifier 7 is connected across the ends of the field winding 5. A load 8 is connected through a switch 9 to the output winding 3.

Main voltage building up means 10 is provided in the stator 2, which comprises a capacitor exciting winding 11 and a capacitor 12 connected across the ends of the capacitor exciting winding 11. The output winding 3 and the capacitor exciting winding 11 are wound on a common core not shown, so that the voltages across the output winding 3 and the capacitor exciting winding 11 may preferably have a phase difference of 90°.

The synchronous generator 1 of the invention also comprises auxiliary voltage building up means 13 provided in the stator. The auxiliary voltage building up means 13 comprises means to flow an initial large current through the auxiliary voltage building up means 13 until a predetermined degree of output voltage is fully built up across the output winding on initiation of the generator 1.

In FIG. 1, the auxiliary voltage building up means 13 may comprise a thermally of sensitive resistor 14A of a positive temperature coefficient connected across the output winding 3 in a manner parallel to the load 8. Such thermally sensitive resistor may be commercially available as posister (trademark).

In operation, since the thermally sensitive resistor 14A is of substantially lower resistance before starting of the synchronous generator 1, the output winding 3 is in the condition of being substantially shorted by the thermally sensitive resistor 14A. As the generator 1 is started, residual magnetism in the rotor core 6 causes a voltage to be induced across the capacitor exciting winding 11. The voltage across the capacitor exciting winding 11 permits an advanced current $I_{12}$ to flow through the capacitor 12. At the same time, since a voltage is induced across the output winding 3, a current $I_{14}$ which approximates a short circuit current flows through the thermally sensitive resistor 14A. Thus, the composite armature reaction by the current $I_{12}$ through the capacitor 12 and the current $I_{14}$ through the thermally sensitive resistor 14A permits a voltage to be induced across the field winding 5. It should be noted that the composite armature reaction is much larger than that only by the capacitor exciting winding 11. As a result, the voltage across the output winding 3 is more rapidly built up. It should be also noted that the build-up of the output voltage across the output winding 3 never largely depends on materials of the core, which enables inexpensive core material to be used. It will be understood that such rapid build-up of the output voltage across the output winding 3 never requires so many turns of the capacitor exciting winding and so large capacitance of the electric capacitor 12.

As the output voltage is built up, the resistance of the thermally sensitive resistor 14A rapidly increases, which causes the current in the thermally sensitive resistor 14A to decrease. Therefore, the thermally sensitive resistor 14A never become a load to the output winding after the build-up of the output voltage. Thus, an electric power can be effectively supplied to the predetermined load 8.

In the embodiment of FIG. 2, the auxiliary voltage building up means 13 may comprise a series connection 14B of an electric resistor 15 having a substantially small resistance and a normally closed relay contact 16 which is opened after a normal operation of the synchronous generator 1 is started. A relay coil 17 may be connected across the output winding 3 through an electric resistor 18 and through its normally closed relay contact 16B. A normally open or self-holding relay contact 16C is connected at its one end through a resistor 19 to the point of junction between the resistor 18 and the normally closed relay contact 16B and at its other end to one end of the output winding 3. The normally closed relay contact 16A is opened by excitation of the relay coil 17. It should be noted that the relay coil 17 is excited by the output voltage fully built up across the output winding 3. It should be also noted that the resistors 18 and 19 are of substantially higher resistance.

In the embodiment of FIG. 2, when a voltage is induced by residual magnetism in the rotor 4, a current which approximates a short circuit current is caused to flow through the normally closed relay contact 16A and the resistor 15. At that time, the relay coil 17 is never excited because there is no enough voltage across the relay coil 17 to excite it. As the output voltage is built up across the output winding 3, the voltage across the resistor 15 becomes higher, and as a result, the voltage enough to excite the relay coil 17 is applied thereto. As the relay coil 17 is excited, the normally open relay contact 16C is closed while the normally closed relay contacts 16A and 16B are opened. Thus, the resistor 15 is displaced out of the output winding 3, which causes the current approximating the short circuit current to be cut. Since the relay coil 17 remains to be connected through the resistors 18 and 19 to the output winding 3, it is self-held unless the output voltage of the generator 1 is decreased. It will be understood that the resistors 18 and 19 have less effect on the load 8. It will be noted that the resistor 15 may be replaced by either of reversely parallel connected diodes, varister and the likes. It will be also understood that if the internal impedance of the relay coil 17 is fully higher, the resistors 18 and 19 may be omitted.

FIG. 3 shows another embodiment of the auxiliary voltage building up means which may comprise a full wave rectifier 20 connected to the output winding 3 and a semiconductor switching device such as a transistor 21 connected to the output of the full wave rectifier 20. A voltage divider 22 of resistors 23 and 24 may be connected to the output of the full wave rectifier 20. A series connection of an electric resistor 25 and another transistor 26 may be also connected to the output of the full wave rectifier 20. The dividing point of the voltage divider 22 or the point of junction between the resistors 23 and 24 may be connected through a reversely disposed Zener diode 27 to the base of the transistor 26. The point of junction between the resistor 25 and the transistor 26 is connected to the base of the main transistor 21.

In the embodiment of FIG. 3, when the induced voltage of the output winding 3 is less than a predetermined value, the output or divided voltage of the voltage divider 22 never reaches the Zener voltage of the Zener diode 27, no base current flows through the transistor 26 with the result that it is not turned on. Then, a base current flows through the resistor 25 to the base of the transistor 21, and as a result, it is turned on. Thus, on starting the synchronous generator 1, a current which approximates a short circuit current is caused to flow through the output winding 3. As the output voltage is built up to the predetermined value, the Zener diode 27 is broken down so as to be turned on, which causes the transistor 27 to be turned on. Thus, the base current no longer flows through the base of the main transistor 21, with the result that it is turned off so as to have no effect on the load 8. It will be noted that the transistor 26, the Zener diode 27 and the resistors 23, 24, 25 and 26 constitute a control circuit to turn on or off the main transistor. It will be also noted that the transistor 21 may be replaced by other semiconductor switching devices such as thyristor, gate-turn off thyristor, triac and the likes.

FIG. 4 shows another embodiment of the synchronous generator 1 in which the auxiliary voltage building up means may comprise an auxiliary winding 3A wound on the stator common core. The auxiliary voltage building up means may be connected across the auxiliary winding 3A. In FIG. 4, the voltage building up means 13 is shown to comprise a thermally sensitive resistor 14A of positive temperature coefficient. It will be understood that the operation of the embodiment of FIG. 4 is substantially identical to that of FIG. 1. After the build-up of the output voltage to the predetermined value, the high resistance of the thermally sensitive resistor 14A restrains a current from flowing therethrough. Thus, the auxiliary winding 3A has no effect on the main output winding 3.

FIG. 5 shows a capacitor exciting type three phase synchronous generator 1A constructed in accordance with the invention. Numerals 3u, 3v and 3w designate output windings of u, v and w phases, respectively, and numerals 13u, 13v and 13w designate auxiliary voltage building up means provided to be connected to the output windings 3u, 3v and 3w, respectively. Main voltage building up means 10 may comprise a capacitor exciting winding 11 wound on a core (not shown) common to that of one of the three output windings 3u, 3v and 3w. The capacitor exciting winding 11 and the corresponding output winding having the common core may be preferably disposed so that the voltages across them have a phase difference of 90°. The auxiliary voltage building up means 13u, 13v and 13w may comprise a thermally sensitive resistor 14A of positive temperature coefficient, although they may comprise either of those shown in FIGS. 2 to 4. It will be understood that the operation of the embodiment of FIG. 5 is substantially identical to that of FIG. 2.

The synchronous generator 1 of FIG. 6 is substantially similar to that of FIG. 1, except that the positive thermally sensitive resistor 14A is connected between one end and a tap t of the output winding 3. It will be understood that in this embodiment, on initiation of the generator 1, the current which approximates the short circuit current flows through a portion 3a of the output winding and the thermally sensitive resistor 14A. In general, it takes a substantial time for the thermally sensitive resistor 14A having a positive temperature coefficient to be heated by itself. Therefore, in case that such thermally sensitive resistor 14A is connected across the whole output winding, as shown in FIG. 1, the latter is shorted by the thermally sensitive resistor for a substantial long time, during which the generator 1 has a substantial large load of the thermally sensitive resistor 14A. As a result, if the generator 1 is driven by an engine, for example, such a large load is applied to the engine on initiation of the generator, which causes the engine to stop. It should be noted that since, in this embodiment, the thermally sensitive resistor 14A is connected across only the portion 3a of the output winding 3, a large current is restrained from flowing through the thermally sensitive resistor 14A on initiation of the generator 1, which causes the load to be smaller against the generator 1.

Figure 8:
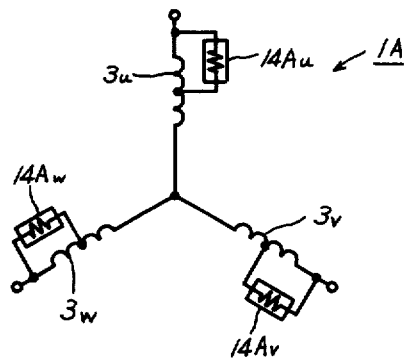
FIG. 8 schematically illustrates the auxiliary voltage building up means of FIG. 6 provided in a three phase synchronous generator in accordance with the invention.

It will be noted that the thermally sensitive resistor 14A may be connected between two taps $t_1$ and $t_2$ of the output winding 3 as shown in FIG. 7, so that another portion 3b of the output winding 3 is connected to the thermally sensitive resistor 14A. It will be also noted that the three thermally sensitive resistors 14Au, 14Av and 14Aw may be connected to the portions of the three output windings 3u, 3v and 3w of the three phase synchronous generator 1A, respectively, as shown in FIG. 8. In this case, a capacitor exciting winding (not shown) of main voltage building up means may be wound on a core common to that of one of the three output windings 3u, 3v and 3w, in a manner identical to that of the embodiment of FIG. 5.

Figure 9:
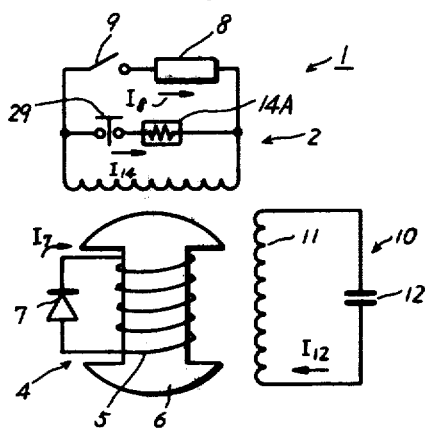
FIG. 9 schematically illustrates further embodiment of a single synchronous generator of the invention.

The synchronous generator 1 of FIG. 9 is also substantially similar to that of FIG. 1, except that a switch 29 such as a push button switch may be connected between one end of the output winding 3 and the thermally sensitive resistor 14A. The switch 29 is closed after the revolution (r.p.m.) of the generator 1 reaches a predetermined value. This switch 29 may remain closed during operation of the generator 1. This is because the thermally sensitive resistor 14A has a rapidly increased resistance by its self-heating on build-up of the output voltage. It should be noted that since the switch 29 is closed only after the revolution of the generator 1 reaches a predetermined value, a power source such as an engine never has a large load applied thereto on initiation of the generator, and as a result, the engine is prevented from stopping before the revolution of the generator 1 reaches it. Even though the generator 1 is started while the switch 9 for the load 8 remains closed, the high output voltage is never built up across the output winding 3 unless the switch 29 is closed. Therefore, in case the load is an electric motor, it can be prevented from its danger. The switch 29 may be preferably a self-return type push button switch.

In the embodiment of FIG. 9, the capacitance of the capacitor 12 and the number of turns of the capacitor exciting winding 11 may be so set that the output voltage is never built up only by the advanced current $I_{12}$ through the capacitor 12. In this design, only on closing of the switch 29, the output voltage can be built up, and therefore, the switch 9 for the load 8 may be omitted. In this case, the switch 29 may be preferably also a self-return type push button switch.

Figure 10:
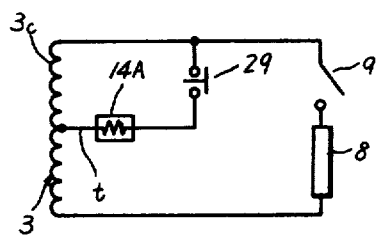
FIG. 10 is a schematic diagram of the modified auxiliary voltage building up means of FIG. 9.

FIG. 10 shows a modification of the embodiment of FIG. 9, in which a series connection of the thermally sensitive resistor 14A and the switch 29 may be connected at one end to the one end of the output winding 3 and at other end to a tap t of the output winding 3 so that the series connection is connected across a portion 3c of the output winding 3. In this modification, the current approximating the short circuit current through the thermally sensitive resistor 14A on initiation of the generator 1 can be limited. Thus, a large load can be prevented from being applied to the generator.

Figure 11:
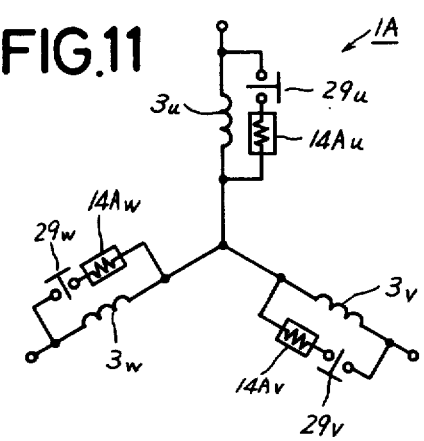
FIG. 11 schematically illustrates the auxiliary voltage building up means substantially similar to that of FIG. 9, but of a three phase synchronous generator.

It will be noted that the three series connections of the thermally sensitive resistors 14Au, 14Av and 14Aw and the switches 29u, 29v and 29w may be connected across the three output windings 3u, 3v and 3w, respectively, as shown in FIG. 11. In this case, a capacitor exciting winding (not shown) of main voltage building up means may be wound on a core common to that of one of the three output windings 3u, 3v and 3w, in a manner identical to that of the embodiment of FIG. 5.

Although some embodiments of the invention have been described and illustrated with reference to the accompanying drawings, it will be understood by those skilled in the art that they are by way of example, and that various changes and modifications may be made without departing from the spirit and the scope of the invention, which is intended to be defined only to the appended claims.

What is claimed is:

1. A synchronous generator comprising a stator having output winding means connected to a load or loads and main voltage building up means including capacitor means and capacitor exciting winding means, said capacitor means being connected across said capacitor exciting winding means, said output winding means and said capacitor exciting winding means being provided on a common core; and a rotor having field winding means across which a rectifier means is connected; wherein said synchronous generator further comprises auxiliary voltage building up means provided in said stator, said auxiliary voltage building up means causing the output winding means to provide said stator with armature reaction when initial large current has flowed through said auxiliary voltage building up means from said output winding means to thereby build up output voltage across said output winding means with the start of said generator.

2. A synchronous generator as set forth in claim 1, wherein said auxiliary voltage building up means is provided in a circuit including said output winding means.

3. A synchronous generator as set forth in claim 1, wherein said auxiliary voltage building up means is provided in a circuit including an auxiliary winding wound on said common core.

4. A synchronous generator as set forth in claim 2, wherein said auxiliary voltage building up means comprises a thermally sensitive resistor of positive temperature coefficient connected across said output winding means.

5. A synchronous generator as set forth in claim 2, wherein said auxiliary voltage building up means comprises a series connection of a resistor having a substantially small resistance and a normally closed relay contact which is opened after build-up of said output voltage, said series connection being connected across said output winding means.

6. A synchronous generator as set forth in claim 2, and wherein said auxiliary voltage building up means comprises a semiconductor switching device connected across said output winding means and a control to turn on said semiconductor switching device only on initiation of said synchronous generator.

7. A synchronous generator as set forth in claim 2, and wherein said auxiliary voltage building up means comprises a thermally sensitive resistor of a positive temperature coefficient connected across a portion of said output winding means.

8. A synchronous generator as set forth in claim 4, and wherein said auxiliary voltage building up means further comprises a switch connected between said thermally sensitive resistor and said output winding means, said switch being closed only after the revolution of said rotor reaches a predetermined value.

9. A synchronous generator as set forth in claim 7, and wherein said auxiliary voltage building up means further comprises a switch connected between said thermally sensitive resistor and said portion of said output winding means, said switch being closed only after the revolution of said rotor reaches a predetermined value.

10. A synchronous generator as set forth in claim 3, and wherein said auxiliary voltage building up means comprises a thermally sensitive resistor of a positive temperature coefficient connected across said auxiliary winding.

11. A synchronous generator as set forth in claim 1, said synchronous generator being of multi-phase and wherein respective auxiliary voltage building up means provided in respective circuits including output winding means.

* * * * *